(12) United States Patent
Weigele et al.

(10) Patent No.: US 8,571,585 B2
(45) Date of Patent: Oct. 29, 2013

(54) METHOD, SYSTEM AND APPARATUS FOR UPDATING A TERMINAL PROFILE

(75) Inventors: Ingo Waldemar Weigele, Waterloo (CA); Alan Ka Chong Sung, Scarborough (CA)

(73) Assignee: BlackBerry Limited, Waterloo (CA)

( * ) Notice: Subject to any disclaimer, the term of this patent is extended or adjusted under 35 U.S.C. 154(b) by 820 days.

(21) Appl. No.: 11/933,799

(22) Filed: Nov. 1, 2007

(65) Prior Publication Data
US 2009/0117875 A1    May 7, 2009

(51) Int. Cl.
*H04W 4/00* (2009.01)

(52) U.S. Cl.
USPC ........ 455/466; 455/411; 455/412.1; 455/418; 455/432.3; 455/558

(58) Field of Classification Search
USPC ............... 455/410, 411, 412.1, 412.2, 432.3, 455/418–420, 558
See application file for complete search history.

(56) References Cited

U.S. PATENT DOCUMENTS

| | | | |
|---|---|---|---|
| 7,286,852 B2 | 10/2007 | Imura | |
| 2002/0029258 A1* | 3/2002 | Mousseau et al. | 709/218 |
| 2002/0037714 A1 | 3/2002 | Takae | |
| 2004/0242197 A1 | 12/2004 | Fontaine | |
| 2005/0059393 A1* | 3/2005 | Knowles | 455/432.3 |
| 2005/0143059 A1* | 6/2005 | Imura | 455/419 |
| 2005/0239505 A1* | 10/2005 | Jeannerod | 455/558 |
| 2006/0212482 A1* | 9/2006 | Celik | 707/104.1 |
| 2008/0032742 A1* | 2/2008 | Celik et al. | 455/558 |
| 2008/0113664 A1* | 5/2008 | Rajan | 455/422.1 |
| 2008/0233977 A1* | 9/2008 | Xu et al. | 455/461 |
| 2009/0029697 A1* | 1/2009 | Bianconi et al. | 455/432.3 |
| 2009/0070159 A1* | 3/2009 | Ahvenainen et al. | 705/7 |
| 2011/0183603 A1* | 7/2011 | Malik | 455/3.01 |
| 2012/0289155 A1* | 11/2012 | Dua | 455/41.1 |

FOREIGN PATENT DOCUMENTS

| | | |
|---|---|---|
| AU | 2005200855 A1 | 2/2005 |
| EP | 1 383 352 A | 1/2004 |
| EP | 1 383 352 A1 | 1/2004 |
| EP | 1 569 475 A | 8/2005 |
| EP | 1 569 475 A1 | 8/2005 |
| EP | 2056630 | 5/2009 |
| EP | 2237586 | 6/2010 |
| EP | 2372071 | 6/2011 |

(Continued)

OTHER PUBLICATIONS

Notification of Transmittal of the International Search Report and the Written Opinion of the International Searching Authority, or Declaration; Jan. 23, 2009; 24 pages.

(Continued)

*Primary Examiner* — Chuong A Ngo
(74) *Attorney, Agent, or Firm* — The Danamraj Law Group, P.C.

(57) ABSTRACT

A method, system and apparatus for maintaining a terminal profile of a mobile communication device. The system comprises a first network node operable to establish with the mobile communication device a wireless data path, to send to the mobile communication device via the wireless data path a terminal profile modification instruction and to receive from the mobile communication device via the wireless data path an acknowledgment. The terminal profile is communicated to a subscriber identity module operable to compare pending instructions to the terminal profile in order to identify and forward authorized instructions.

14 Claims, 6 Drawing Sheets

(56) References Cited

FOREIGN PATENT DOCUMENTS

| IN | 2175/DELNP/2010 | 3/2012 |
|----|----|----|
| JP | 2003-186677 | 4/2003 |
| KR | 20070092378 | 9/2007 |
| KR | 1020100049126 | 5/2010 |
| WO | 2004023306 A2 | 3/2004 |
| WO | 2005079144 A2 | 9/2005 |
| WO | 2009055910 | 5/2009 |

OTHER PUBLICATIONS

Corrected Version of PCT Written Opinion No. PCT/CA2008/001903; International Searching Authority; Mar. 31, 2009; 18 pages.
European Search Report; European Patent Office; Apr. 4, 2008; 6 pages.
EPO Extended Search Report, Application No. 10170183.7, European Patent Office, dated Aug. 20, 2010, 6 pgs.
EPO, Communication Pursuant to Article 94(3) EPC, Application No. 10170183.7, Jul. 13, 2011, 4 pgs.
KIPO, Office Action, Application No. 10-2010-7007061, Jun. 24, 2011, 4 pgs.
EPO, Decision to Grant a European Patent Pursuant to Article 97(1) EPC, Application No. 07119835.2, Nov. 25, 2010, 1 pg.
EPO, Extended Search Report, Application No. 11171975.3, Aug. 19, 2011, 5 pgs.
Hong Kong IPD, Certificate of Grant, Application No. 09109334.7, Nov. 1, 2007, 3 pgs.
JPO, Notice of Reasons for Rejection, Application No. 2010-530237, Feb. 17, 2012, 9 pgs.
3rd Generation Partnership Project; Technical Specification Group Terminals; 2G/3G Java Card API based applet interworking; 3GPP TR 31.919 V1.0.0, May 2003, 9 pgs.
3rd Generation Partnership Project; Technical Specification Group Terminals; USIM Application Toolkit (USAT); 3GPP TS 31.111 V3.13.0, Sep. 2004, 139 pgs.
3rd Generation Partnership Project; Technical Specification Group Core Network and Terminals; UICC-terminal interface; Physical and logical characteristics; 3GPP TS 31.101 V6.5.1; Jan. 2006, 9 pgs.
SIPO, Office Action, Application No. 200880113519.3, Jul. 4, 2012, 3 pgs.
IP India, Notice of Decision for Patent, Application No. 10-2010-7007061, Mar. 28, 2012, 3 pgs.
KIPO, Decision to Grant a Patent, Application No. 10-2010-7007061, Mar. 28, 2012, 3 Pgs.
EPO, Communication Pursuant to Article 94(3) EPC, Application No. 10170183.7, Jun. 19, 2012, 4 pgs.
JPO, Office Action, Application No. 2010-530237, Jun. 1, 2012, 4 pgs.
CIPO, Office Action, Application No. 2,704,260, Dec. 4, 2012, 4 pgs.
EPO, Communication Pursuant to Article 94(3) EPC, Application No. 11171975.3, Dec. 5, 2012, 4 pgs.
SIPO, Second Office Action, Application No. 200880113519, Mar. 26, 2013, 3 pgs.
EPO, Communication Pursuant to Article 94(3) EPC, Application No. 10170183.7, Aug. 27, 2013, 5 pgs.

\* cited by examiner

METHOD, SYSTEM AND APPARATUS FOR UPDATING A TERMINAL PROFILE

TECHNICAL FIELD OF THE APPLICATION

The present disclosure generally relates to wireless packet data service networks. More particularly, and not by way of any limitation, the present disclosure is directed to a mobile communication device and related data service network employing a method and system for updating the terminal profile of a mobile communication device via wireless means.

BACKGROUND

The present disclosure is directed toward the management of the terminal profile of a mobile communication device. The terminal profile for a mobile communication device defines the operations, if any, which the mobile communication device is capable of executing or authorized to execute. According to certain wireless system protocols, the terminal profile is provided to a subscriber identification module when the module is being initialized. Using the terminal profile as a guide, the subscriber identification module can avoid sending the mobile communication device an instruction which it is unable or unauthorized to execute.

BRIEF DESCRIPTION OF THE DRAWINGS

A more complete understanding of the embodiments of the present disclosure may be had by reference to the following Detailed Description when taken in conjunction with the accompanying drawings wherein.

DETAILED DESCRIPTION OF THE DRAWINGS

A system and method of the present disclosure will now be described with reference to various examples of how the embodiments can best be made and used. Identical reference numerals are used throughout the description and several views of the drawings to indicate identical or corresponding parts, wherein the various elements are not necessarily drawn to scale.

According to a first aspect, the present disclosure relates to a method of maintaining a terminal profile of a mobile communication device. The method comprises receiving from a network node via a wireless data path a terminal profile modification instruction; modifying a terminal profile within the mobile communication device according to the terminal profile modification instruction received from the network node via the wireless data path; communicating the terminal profile to a subscriber identity module; comparing a pending instruction to the terminal profile; and forwarding the pending instruction when the pending instruction is authorized by the terminal profile.

In certain embodiments, the terminal profile is communicated to a Subscriber Identity Module (SIM) or Removable User Identity Module (RUIM). The terminal profile may be managed by a SIM/RUIM interface. The wireless data path may pass through a message relay or a wireless gateway. The wireless data path may be a virtual private network. The method may further comprise the step of executing an authorized instruction.

According to a second aspect, the present disclosure relates to a system for maintaining a terminal profile of a mobile communication device. The system comprises a network node operable to establish with the mobile communication device a wireless data path, to send to the mobile communication device via the wireless data path a terminal profile modification instruction and to receive from the mobile communication device via the wireless data path an acknowledgment of the instruction; wherein the terminal profile is communicated to a subscriber identity module operable to compare pending instructions to the terminal profile in order to identify and forward authorized instructions.

According to a third aspect, the present disclosure relates to a mobile communication device. The device comprises means for receiving from a network node via a wireless data path a terminal profile modification instruction; means for modifying a terminal profile within the mobile communication device according to the terminal profile modification instruction received from the network node via the wireless data path; means for communicating the terminal profile to one or more of a Subscriber Identity Module (SIM) and a Removable User Identity Module (RUIM); means for comparing a pending instruction to the terminal profile to determine whether the pending instruction is an authorized instruction; and means for executing an authorized instruction.

Figure 1:
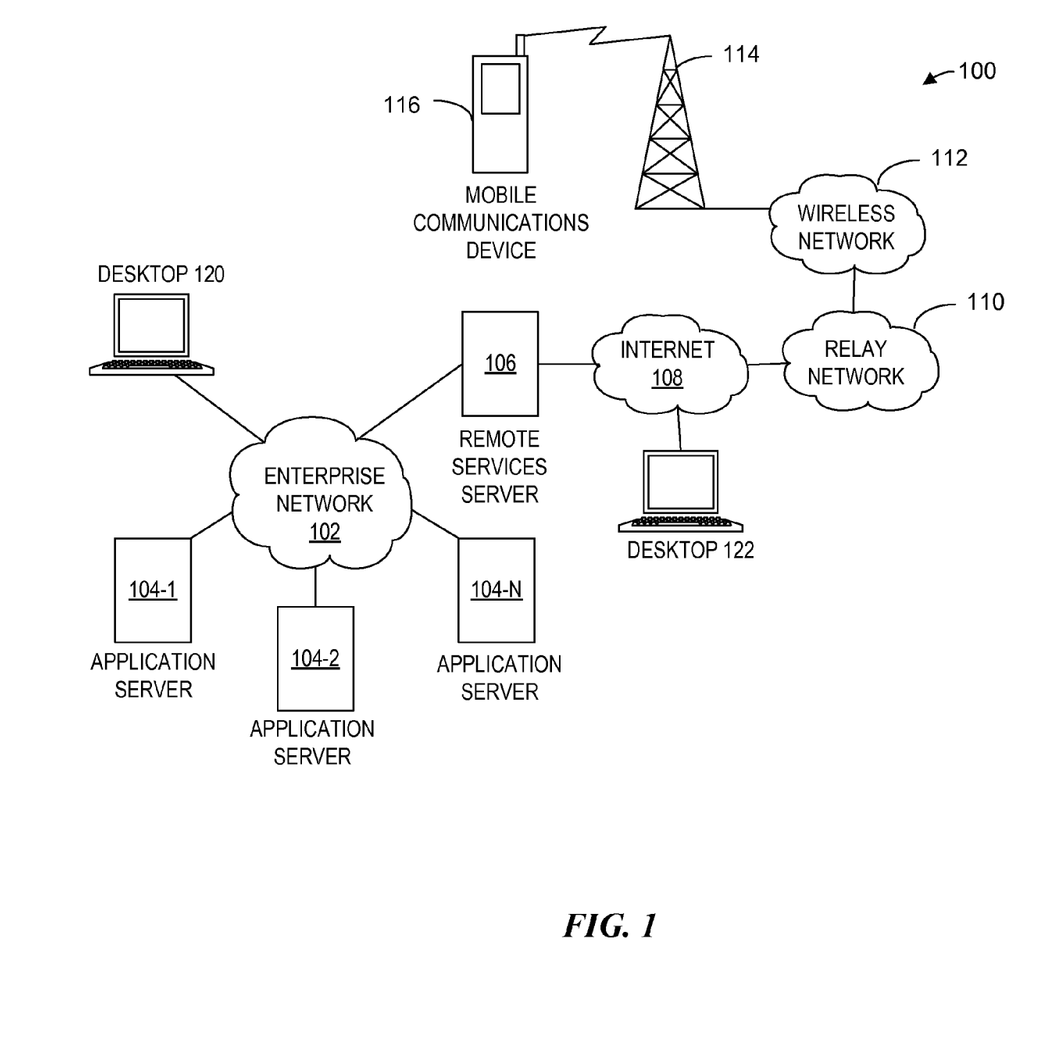
FIG. 1 depicts an exemplary network environment including a wireless packet data service network wherein an embodiment of the present disclosure may be practiced.

Referring now to the drawings, and more particularly to FIG. 1, depicted therein is an exemplary network environment 100 including a wireless packet data service network 112 wherein an embodiment of the present system may be practiced. An enterprise network 102, which may be a packet-switched network, can include one or more geographic sites and may be organized across many radio access technologies (RATs) as a local area network (LAN), wide area network (WAN) or metropolitan area network (MAN), et cetera, for serving a plurality of corporate users.

A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. A single desktop computer 120 is shown connected to enterprise network 102, but those of skill in the art will appreciate that a diverse array of devices, including but not limited to desktop computers, laptop computers, palmtop computers, et cetera, although not specifically shown in FIG. 1, may be operably networked to one or more of the application servers 104-$i$, i=1, 2, . . . , N, with respect to the services supported within enterprise network 102.

Additionally, a remote services server 106 may be interfaced with the enterprise network 102 for enabling a corporate user to access or effectuate any of the services from a remote location using a suitable mobile communication device 116. By way of example, mobile communication device 116 may be a data-enabled handheld device capable of receiving and sending messages, web browsing, interfacing with corporate application servers, et cetera. A secure communication link with end-to-end encryption may be established that is mediated through an external IP network, i.e., a public packet-switched network such as the Internet 108, as well as the wireless packet data service network 112 operable with mobile communication device 116 via suitable wireless network infrastructure that includes a base station (BS) 114.

A single desktop computer 122 is shown connected to internet 108 for purposes of illustration. Those of skill in the art will appreciate that millions of devices are in fact connected to the internet 108, as discussed above with respect to enterprise network 102. These include, but are not limited to, desktop computers, laptop computers, palmtop computers, cellular telephones, personal digital assistants and other mobile communication devices. In one embodiment, a trusted relay network 110 may be disposed between the Internet 108 and the infrastructure of wireless packet data service network 112.

For purposes of the present disclosure, the wireless packet data service network 112 may be implemented in any known or heretofore unknown mobile communications technologies and network protocols. For instance, the wireless packet data service network 112 may include a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, or any 3rd Generation (3G) network. By way of providing an exemplary embodiment, the teachings of the present disclosure will be illustrated with a GPRS-based carrier network, although those skilled in the art should readily recognize that the scope of the present disclosure is not limited thereby.

Figure 2:
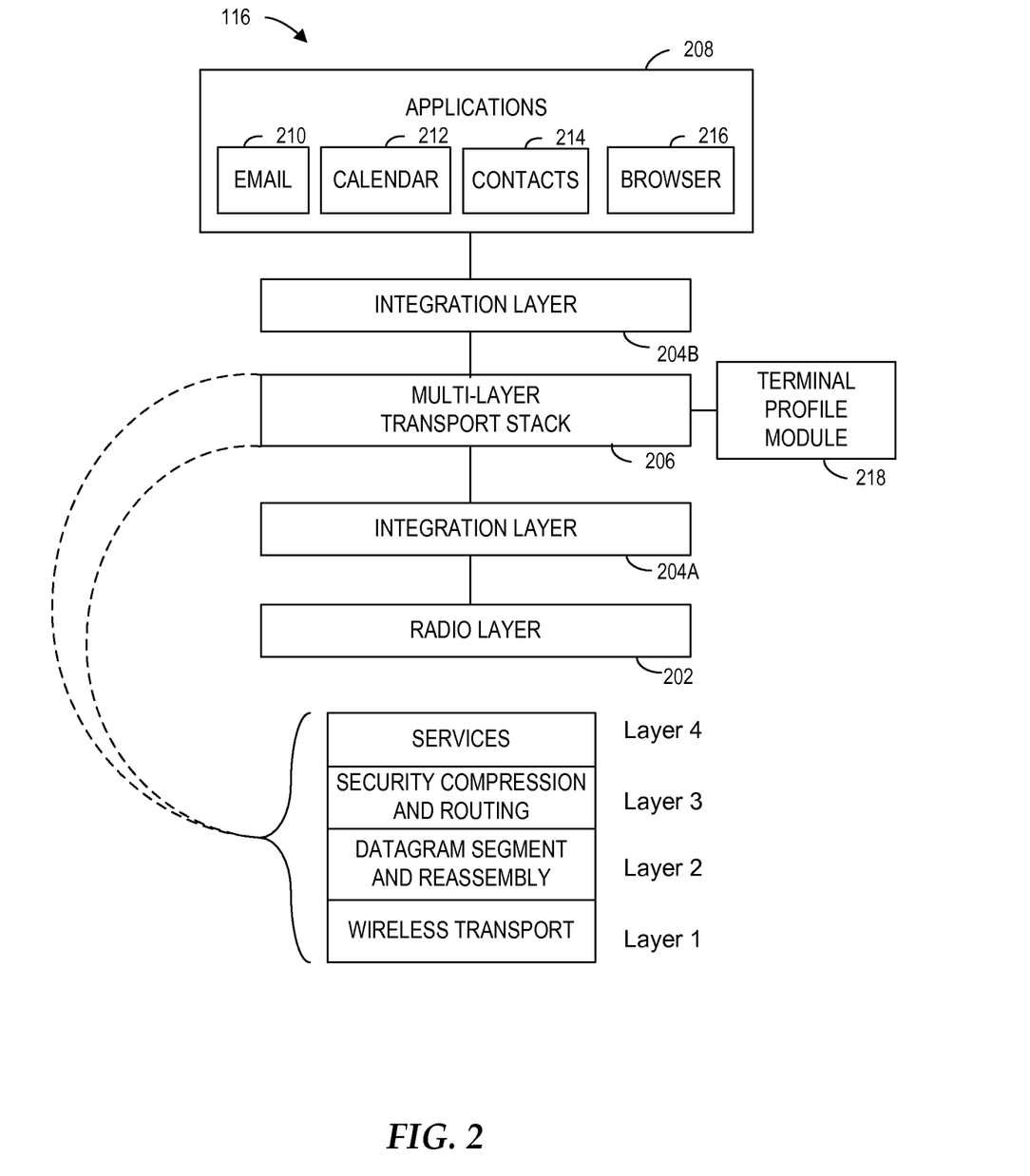
FIG. 2 depicts a software architectural view of a mobile communication device according to one embodiment.

FIG. 2 depicts a software architectural view of a mobile communication device 116 according to one embodiment. A multi-layer transport stack (TS) 206 is operable to provide a generic data transport protocol for any type of corporate or personal data, including email, via a reliable, secure and seamless continuous connection to a wireless packet data service network. As illustrated in this embodiment, an integration layer 204A is operable as an interface between the radio layer 202 and the transport stack 206 of mobile communication device 116. Likewise, another integration layer 204B is provided for interfacing between the transport stack 206 and the user applications 208 supported on the mobile communication device 116, e.g., email 210, calendar/scheduler 212, contact management 214 and browser 216. Although not specifically shown, the transport stack 206 may also be interfaced with the operating system of mobile communication device 116. In another implementation, the transport stack 206 may be provided as part of a data communications client module operable as a host-independent virtual machine on a mobile device. A terminal profile management module 218 is operably connected to the transport stack in order to facilitate maintenance of the terminal profile for the mobile communication device 116, as will be described in further detail below.

The bottom layer (Layer 1) of the transport stack 206 is operable as an interface to the wireless network's packet layer. Layer 1 handles basic service coordination within the exemplary network environment 100 shown in FIG. 1. The top layer (Layer 4) exposes various application interfaces to the services supported on the mobile communication device. The remaining two layers of the transport stack 206, Layer 2 and Layer 3, are responsible for datagram segmentation/reassembly and security, compression and routing, respectively. The radio layer 202 may be any number of a plurality of mobile communication technologies or RATs (which may include, but are not limited to GPRS, EVDO, UMTS, HSDPA, Wi-fi, Bluetooth and WiMAX).

Figure 3:
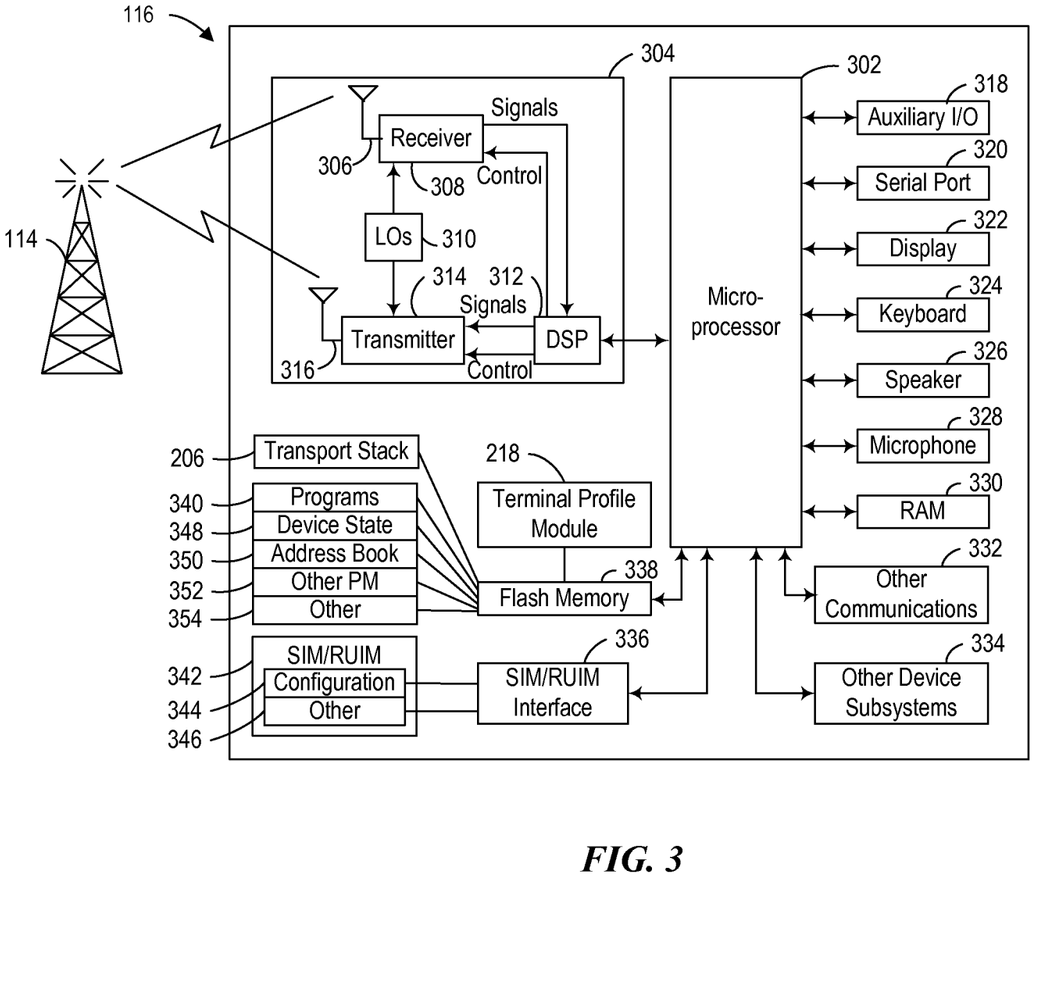
FIG. 3 depicts a block diagram of a mobile communication device according to one embodiment.

FIG. 3 depicts a block diagram of a mobile communication device according to one embodiment. It will be recognized by those skilled in the art upon reference hereto that although an embodiment of mobile communication device 116 may comprise an arrangement similar to one shown in FIG. 3, there can be a number of variations and modifications, in hardware, software or firmware, with respect to the various modules depicted. Accordingly, the arrangement of FIG. 3 should be taken as illustrative rather than limiting with respect to the embodiments of the present disclosure.

A microprocessor 302 providing for the overall control of an embodiment of mobile communication device 116 is operably coupled to a communication subsystem 304 which includes a receiver 308 and transmitter 314 as well as associated components such as one or more local oscillator (LO) modules 310 and a processing module such as a digital signal processor 312. Those of skill in the art will appreciate that the functionality represented by microprocessor 302 may be performed by multiple separate components, which may include multiple microprocessors or a single microprocessor working in concert with other components. As will be apparent to those skilled in the field of communications, the particular design of the communication module 304 may be dependent upon the communications network with which the mobile communication device 116 is intended to operate.

In one embodiment, the communication module 304 is operable with both voice and data communications. Regardless of the particular design, however, signals received by antenna 306 from base station 114 are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by digital signal processor 312, and provided to transmitter 314 for digital-to-analog (D/A) conversion, frequency up conversion, filtering, amplification and transmission over the air-radio interface via antenna 316.

Microprocessor 302 also interfaces with further device subsystems such as auxiliary input/output (I/O) 318, serial port 320, display 322, keyboard 324, speaker 326, microphone 328, random access memory (RAM) 330, short-range communications subsystem or subsystems 332, and any other device subsystems generally labeled as reference numeral 334. A Subscriber Identity Module (SIM) or Removable User Identity Module (RUIM) interface 336 is also provided in communication with the microprocessor 302.

In one implementation, SIM/RUIM interface 336 is operable with a SIM/RUIM card 342 storing a number of configurations 344 and other information 346 such as the terminal profile for the device, terminal identification and subscriber-related data. Operating system software and transport stack software may be embodied in a persistent storage module (i.e., non-volatile storage) such as flash memory 338. In one implementation, flash memory 338 may be segregated into different areas, e.g., storage area for computer programs 340 as well as data storage regions such as device state 348, address book 350, other personal information manager (PIM) data 352, and other data storage areas generally labeled as reference numeral 354. Terminal profile module 218, including status update module 220, is operably connected to flash memory 338, including transport stack 206. As noted above and described in further detail below, terminal profile module 218 is operable to communicate with other devices as appropriate, generally via a wireless communication path.

The TERMINAL PROFILE data set provides the SIM/RUIM 342 with information related to the operational capabilities of the mobile communication device 116. The terminal profile may, for example, control functions related to launching a browser, call control, short message system (SMS) control, call setup, supplementary services, SMS messaging and forwarding of location information. Given the information as to the operational capabilities of mobile communication device 116, the SIM/RUIM 342 can limit the set of instructions sent to mobile communication device 116, and thereby avoid the situation wherein the SIM/RUIM 342 sends to mobile communication device 116 an instruction which mobile communication device 116 is operationally incapable of executing or unauthorized to execute. The proper format and syntax of the TERMINAL PROFILE data set is specified in 3GPP TS 31.111. The TERMINAL PROFILE data set is a series of bytes, wherein each bit in each byte serves as a flag indicating whether a particular operational capability is supported by mobile communication device 116. Bits set to '1' (high) represent facilities supported by mobile communication device 116, while bits set to '0' (low) represent facilities not supported by mobile communication device 116.

Although the TERMINAL PROFILE data set may be hard-coded in certain mobile devices, mobile communication device 116 incorporates a modifiable terminal profile data set in order to allow it to be updated. Update of the data set may be performed remotely via a wireless connection in order to maintain conformance with customer requirements. Certain SIM-related operations may be deemed undesirable for some customers. The capability to modify a dialed phone number or to query and report the location of mobile communication device 116, for example, may give rise to security risks in certain environments.

Figure 4:
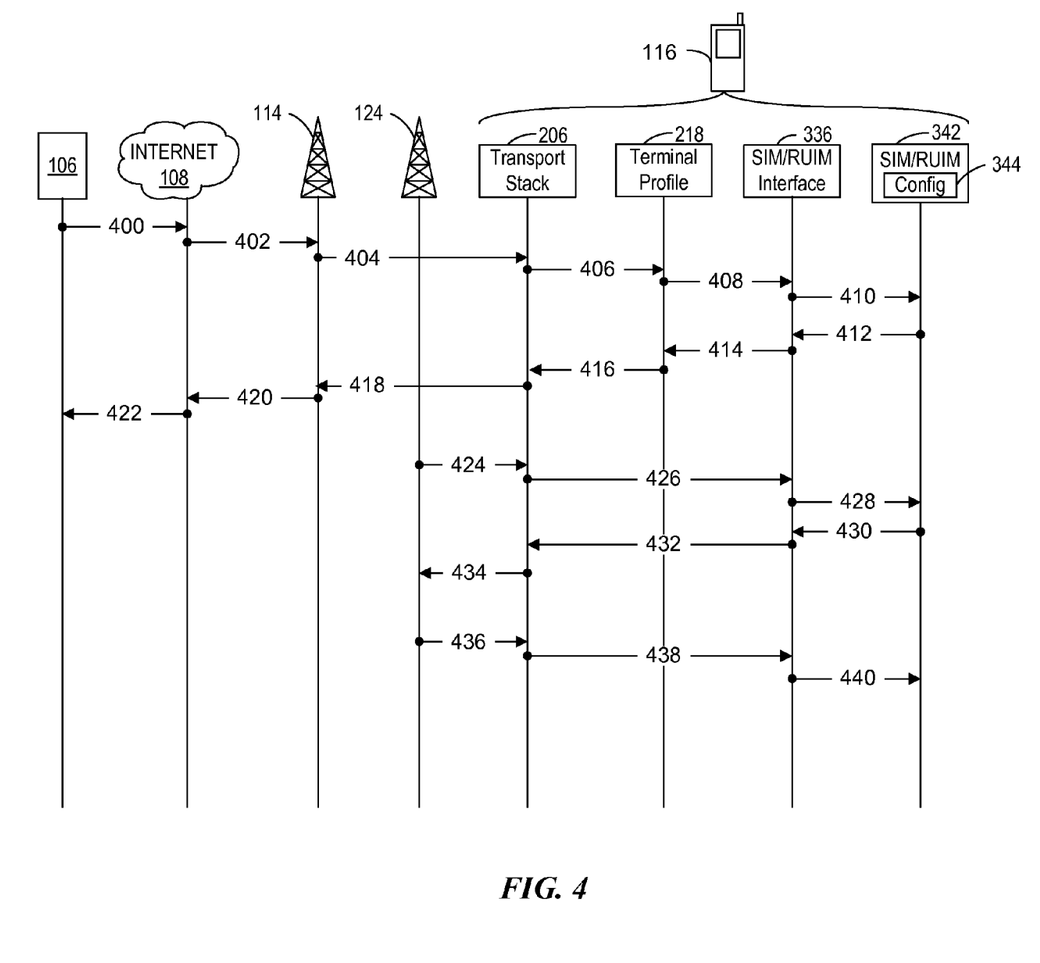
FIG. 4 depicts a message flow diagram depicting the flow of messages between a mobile communication device, a first wireless network and a second wireless network.

The process of updating the terminal profile of mobile communication device 116 is depicted in FIG. 4. Although the process shown in FIG. 4 is presented as an exemplary process, those of skill in the art will recognize that a variety of processes and variations may be employed for this purpose. The details of the process shown in FIG. 4 are presented by way of example, and are not intended to be construed in a limiting sense. The process depicted in FIG. 4 begins with a terminal profile update instruction 400 from remote services server 106 to internet 108, which is forwarded to base station 114 as message 402. Base station 114 forwards the instruction to mobile communication device 116 as message 404. This message arrives at transport stack 206 and is forwarded to terminal profile module 218 as message 406. The instruction is processed by terminal profile module 218, which sends message 408 to SIM/RUIM interface 336, which is forwarded as message 410 to configurations storage 344 of SIM/RUIM card 342. Those of skill in the art will understand that execution of the instruction to modify the terminal profile may take place significantly later than the time at which the instruction is received. In certain applications, the terminal profile can only be modified at certain discrete points in time and under certain specific circumstances. In the embodiment shown in FIG. 4, an acknowledgment message 412 is sent from SIM/RUIM card 342 to SIM/RUIM interface 336, forwarded as message 414 to terminal profile module 218, as message 416 to transport stack 206, then as message 418 to base station 114, message 420 to internet 108 and message 422 to remote services server 106.

At a later point in time, mobile communication device 116 is in communication with base station 124. An instruction 424 is sent from base station 124 to mobile communication device 116. Message 424 is received at transport stack 206 and forwarded to SIM/RUIM interface 336 as message 426, which is then forwarded to SIM/RUIM card 342 as message 428. Upon receipt of the instruction from received from base station 124, SIM/RUIM 342 checks the instruction against the terminal profile for mobile communication device 116. In this case, the instruction is authorized under the terminal profile, and the instruction is forwarded to the transport stack 206, as represented by messages 430 and 432. After execution of the instruction, an acknowledgment message may be sent back to base station 124, as represented by message 434. As noted above, those of skill in the art that the details presented in FIG. 4 represent the details of one exemplary embodiment under particular circumstances. Differing implementations may include different details, features, and mechanisms as appropriate for varying applications. As an example, a command for the mobile communication device 116 can originate internally from the SIM/RUIM 342 without any external communication from the base station 124.

Subsequent in time to the communication represented by messages 424-434, a second instruction is sent from the base station 124. This instruction is forwarded from the transport stack 206 to the SIM/RUIM interface 336 and from there to the SIM/RUIM 342, as represented by messages 436-440. In contrast to the instruction received previously, the instruction represented by messages 436-440 is not an authorized instruction under the terminal profile. Upon a review of the terminal profile, SIM/RUIM 342 determines that the instruction is not authorized for mobile communication device 116, and SIM/RUIM 342 does not, therefore, forward the instruction. As above, this second command could, alternately, originate internally from the SIM/RUIM 342 without any external communication from the base station 124. This is all within the spirit and scope of the present disclosure.

Figure 5:
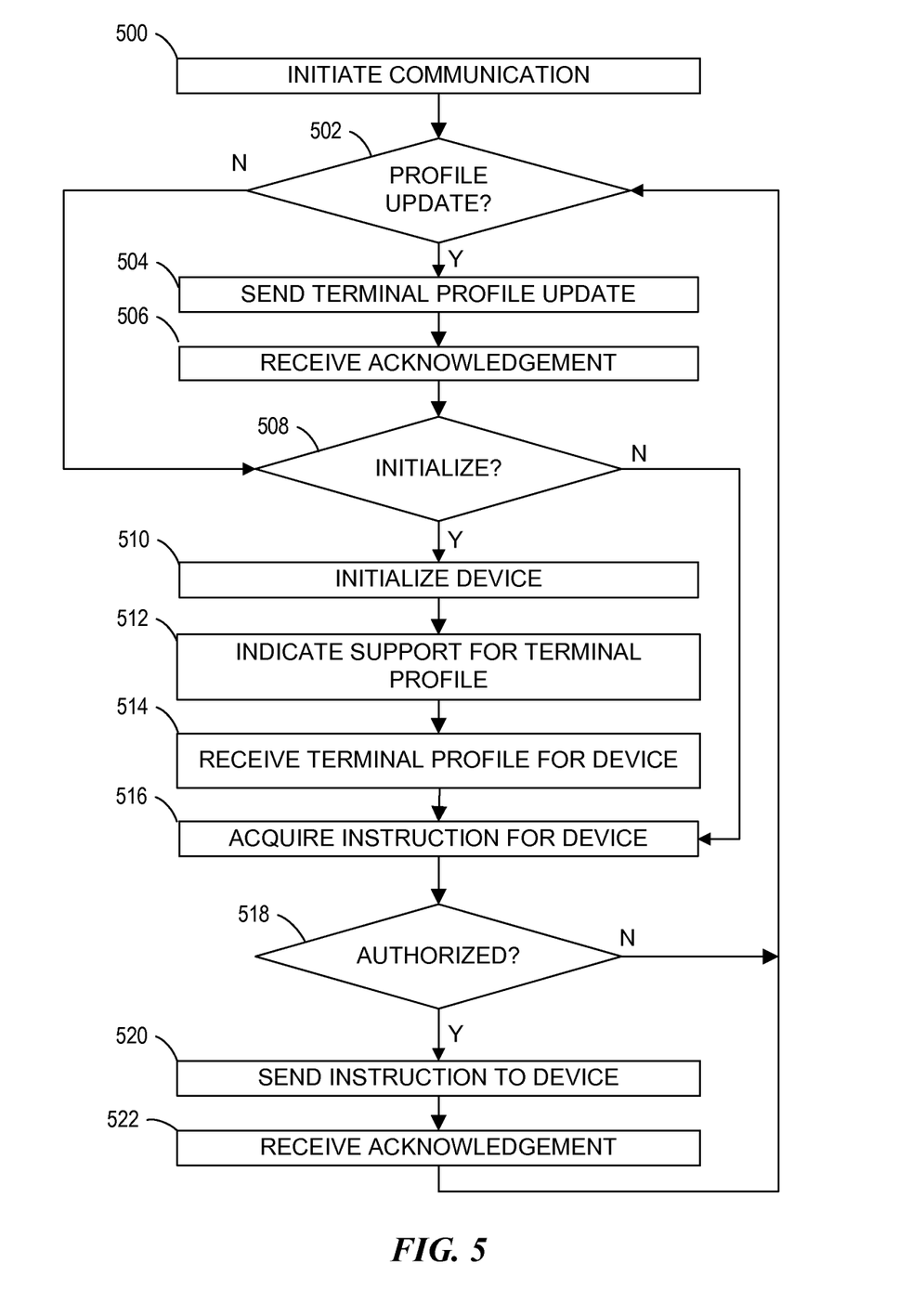
FIG. 5 depicts a flowchart showing the process, within a network node, of updating and managing a terminal profile according to one embodiment.

FIG. 5 is a diagram depicting the process of terminal profile maintenance in flowchart form. Process flow begins in block 500, where communication is initiated between a network node and a mobile communication device, after which point process flow proceeds to decision block 502. In decision block 502, a determination is made as to whether an update of the terminal profile of the mobile communication device is necessary. If no terminal profile update is necessary, process flow proceeds to block 508, which is discussed below. If a terminal profile update is necessary, process flow proceeds to block 504, where a terminal profile update is sent to the mobile communication device and then to block 506, where an acknowledgment of the update is received, and then to block 508.

Process flow from decision block 508 depends upon whether mobile communication device 116 is to be initialized. If the device is not to be initialized at this time, process flow proceeds to block 516. If mobile communication device 116 is to be initialized, process flow proceeds to block 510. In block 510, the device is initialized, and process flow proceeds to block 512. In block 512, the SIM/RUIM card 342 indicates support for terminal profile in the SIM service table. In block 514, the terminal profile is received.

In block 516, the SIM/RUIM card 342 acquires an instruction for mobile communication device 116. In order to avoid sending an instruction to mobile communication device 116 which mobile communication device 116 is incapable of executing or unauthorized to execute, an inquiry is made in block 518 as to whether the instruction is within the terminal profile for mobile communication device 116. If the instruction is not within the terminal profile, the instruction is not sent and process flow returns to block 502. If the instruction is within the terminal profile, the instruction is sent to mobile communication device 116 in block 520, an acknowledgment is received in block 522, and process flow then returns to block 502.

Figure 6:
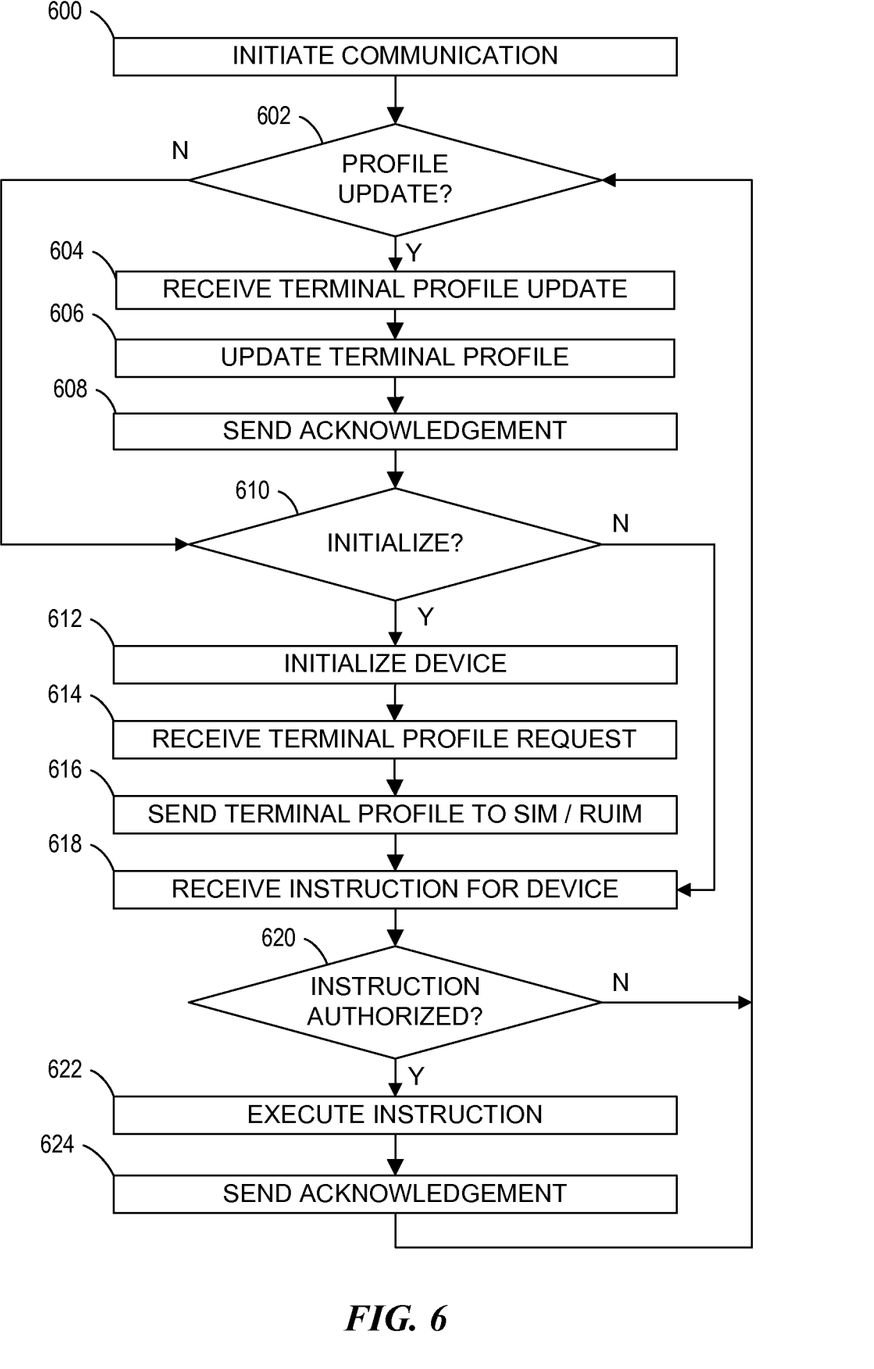
FIG. 6 depicts a flowchart showing the process, within a mobile communication device, of managing a terminal profile according to one embodiment.

FIG. 6 is a flowchart depicting the process of FIG. 5 as executed within the mobile communication device. Process flow begins in block 600, wherein communication is initiated between mobile communication device 116 and a network node, after which process flow proceeds to decision block 602. Process flow from decision block 602 depends on whether a terminal profile update instruction has been sent from the network node. If a terminal profile update instruction has not been sent, then process flow drops down to block 610, which is described below. If a terminal profile update instruction has been sent, process flow proceeds to block 604, where the terminal profile update is received, then to block 606, where the terminal profile is updated, and then to block 608 where an acknowledgment is sent back to the network node. Process flow then proceeds to block 610.

Process flow from block 610 depends upon whether mobile communication device 116 is to be initialized. If mobile communication device 116 is not to be initialized, process flow proceeds to block 618, described below. If mobile communication device 116 is to be initialized, process flow proceeds to block 612, wherein the device is initialized. In block 614, mobile communication device 116 receives a request for terminal profile data from SIM/RUIM card 342. In block 616, mobile communication device 116 sends the requested terminal profile data for mobile communication device 116, and process flow proceeds to block 618.

In block 618, SIM/RUIM 342 receives an instruction for mobile communication device 116 and process flow proceeds to block 620. Process flow from block 620 depends on whether the received instruction is authorized. If the instruction is not authorized, process flow returns to block 602. If the instruction is authorized, process flow proceeds to block 622. In block 622, the instruction is executed. In block 624, an acknowledgment is sent, after which process flow returns to decision block 602.

It is believed that the operation and construction of the embodiments of the present disclosure will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method of maintaining a terminal profile of a mobile communication device, the method comprising:
   wirelessly receiving a terminal profile modification instruction;
   modifying a terminal profile within a subscriber identity module of the mobile communication device based on the terminal profile modification instruction to set a particular bit of the terminal profile for representing that a facility to forward location information is supported or not supported by the mobile communication device;
   storing the modified terminal profile in the subscriber identity module of the mobile communication device;
   comparing a location query relative to the location of the mobile communication device to the modified terminal profile; and
   forwarding the location information of the mobile communication device only when it is authorized by the modified terminal profile.

2. The method as recited in claim 1, wherein the location query is wirelessly received.

3. The method as recited in claim 1, wherein the terminal profile modification instruction is received via one of a wireless gateway and a message relay.

4. The method as recited in claim 1, wherein the terminal profile modification instruction is received via a secure data path.

5. The method as recited in claim 1, wherein the terminal profile modification instruction is received via a virtual private network.

6. A mobile communication device comprising:
   a component configured to wirelessly receive a terminal profile modification instruction;
   a component configured to modify a terminal profile within a subscriber identity module of the mobile communication device based on the terminal profile modification instruction to set a particular bit of the terminal profile for representing that a facility to forward location information is supported or not supported by the mobile communication device;
   a component configured to store the modified terminal profile in the subscriber identity module of the mobile communication device;
   a component configure to compare a location query relative to the location of the mobile communication device to the modified terminal profile; and
   a component configured to forward the location information of the mobile communication device only when it is authorized by the modified terminal profile.

7. The device as recited in claim 6, wherein the location query is wirelessly received by the mobile communication device.

8. The device as recited in claim 6, wherein the terminal profile modification instruction is received via a secure data path.

9. The device as recited in claim 6, wherein the terminal profile modification instruction is received via a message relay.

10. The device as recited in claim 6, wherein the terminal profile modification instruction is received via a wireless gateway.

11. The device as recited in claim 6, wherein the terminal profile modification instruction is received via a virtual private network.

12. A network node adapted to maintain a terminal profile of a mobile communication device, the network node comprising:
    means configured to wirelessly transmit a terminal profile modification instruction to the mobile communication device, wherein the terminal profile modification is operable to modify a terminal profile within a subscriber identify module of the mobile communication device based on the instruction to set a particular bit of the terminal profile for representing that a facility to forward location information is supported or not supported by the mobile communication device;
    means configured to wirelessly receive an acknowledgement of receipt of the terminal profile modification instruction from the mobile communication device,
    wherein the modified terminal profile is stored in the subscriber identity module of the mobile communication device and configured to be compared against a location query relative to the location of the mobile communication device before the location information of the mobile communication device is forwarded.

13. The network node as recited in claim 12, wherein the terminal profile modification instruction is transmitted via one of a virtual private network and a secure data path.

14. The network node as recited in claim 12, wherein the terminal profile modification instruction is transmitted via one of a wireless gateway and a message relay.

* * * * *